(12) United States Patent
Choi et al.

(10) Patent No.: US 7,349,460 B2
(45) Date of Patent: Mar. 25, 2008

(54) MC/MC-DS DUAL-MODE ADAPTIVE MULTI-CARRIER CODE DIVISION MULTIPLE ACCESS (CDMA) APPARATUS AND METHOD THEREOF

(75) Inventors: Kwon-Hue Choi, Daejon (KR); Soo-Young Kim, Daejon (KR); Deock-Gil Oh, Daejon (KR)

(73) Assignee: Electronics and Telecommunications Research Institute (KR)

( * ) Notice: Subject to any disclaimer, the term of this patent is extended or adjusted under 35 U.S.C. 154(b) by 769 days.

(21) Appl. No.: 10/322,069

(22) Filed: Dec. 17, 2002

(65) Prior Publication Data

US 2004/0066838 A1  Apr. 8, 2004

(30) Foreign Application Priority Data

Oct. 7, 2002  (KR) .................. 10-2002-0061079

(51) Int. Cl.
*H04B 1/00*  (2006.01)
(52) U.S. Cl. .................. 375/146; 370/320; 370/335; 370/342; 370/441; 370/537; 370/538; 375/260; 398/78
(58) Field of Classification Search ............... 375/146, 375/260, 259
See application file for complete search history.

(56) References Cited

U.S. PATENT DOCUMENTS

| 5,729,570 | A | | 3/1998 | Magill |
| 5,946,356 | A | * | 8/1999 | Felix et al. .................. 375/295 |
| 6,061,386 | A | * | 5/2000 | Molev-Shteiman .......... 375/140 |
| 6,353,637 | B1 | * | 3/2002 | Mansour et al. ............. 375/260 |
| 6,704,366 | B1 | * | 3/2004 | Combes et al. .............. 375/260 |
| 6,882,619 | B1 | * | 4/2005 | Gerakoulis ................... 370/209 |
| 2002/0136276 | A1 | * | 9/2002 | Franceschini et al. ....... 375/148 |

FOREIGN PATENT DOCUMENTS

| KR | 2001-0110459 | 12/2001 |
| KR | 2002-0000176 | 1/2002 |

OTHER PUBLICATIONS

2001 IEEE, "A Programmable Transceiver Structure of Multi-rate OFDN-CDMA for Wireless Multimedia Communications", P. Fu, et al., 5 pages.

* cited by examiner

*Primary Examiner*—David C. Payne
*Assistant Examiner*—Adolf DSouza
(74) *Attorney, Agent, or Firm*—Blakely, Sokoloff, Taylor & Zafman

(57) ABSTRACT

Provided are multi-carrier (MC)/multi-carrier direct sequence (MC-DS) dual-mode adaptable CDMA apparatus, the method thereof, and a computer program that implements the method. The apparatus can vary the user modulation degree and the transmission repetition degree independently, and convert a spreading scheme between the time-based spreading scheme (MC-DS-CDMA) and the frequency-based spreading scheme (MC-CDMA) in a MC-CDMA system. The apparatus includes: a user signal processing unit for performing symbol modulation, repetition and spreading of bit stream for each user based on a transmission mode suitable for channel environment of each user, and generating spread chip streams for the user; a combining unit for adding up all the spread chip streams for the users; a first interleaving unit for interleaving the chip streams added up in the combining unit and generating a first interleaved stream; and a second interleaving unit for optionally performing a second interleaving on the first interleaved stream.

15 Claims, 4 Drawing Sheets

PRIOR ART

MC/MC-DS DUAL-MODE ADAPTIVE MULTI-CARRIER CODE DIVISION MULTIPLE ACCESS (CDMA) APPARATUS AND METHOD THEREOF

FIELD OF THE INVENTION

The present invention relates to a multi-carrier (MC)/multi-carrier direct sequence (MC-DS) dual-mode adaptive multi-carrier code division multiple access (MC-CDMA) apparatus, the method thereof, and a computer-readable recording medium for recording a program that implements the method; and, more particularly, to a MC/MC-DS dual-mode adaptive MC-CDMA apparatus that supports two orthogonal code spreading schemes, i.e., a time-based spreading scheme (which is MC-DS-CDMA) and a frequency-based spreading scheme (which is MC-CDMA), simultaneously so that the two schemes can be converted to each other, and changes modulation degrees and the number of transmission repetition independently according to the channel condition of a user in a down-link MC-CDMA system, the method thereof, and a computer-readable recording medium for recording a program that implements the method.

In other words, the present invention provides a transmission apparatus that can vary the degree of modulation and the number of symbol repetitions separately according to the channel condition of a user in a MC-CDMA system, and selects one spreading scheme between the time-based spreading scheme (MC-DS-CDMA) and the frequency-based spreading scheme (MC-CDMA), in the level of the system, the method of the apparatus, and a recording medium.

DESCRIPTION OF RELATED ART

Prior technology related to the apparatus and method of the present invention is 'A Programmable Transceiver Structure of Multi-rate OFDM-CDMA for Wireless Multimedia Communications,' published in 'Proceedings of VTC'01,' pp. 1942-1946 by Po-Wei Fu and Kwang-Cheng Chen. In the above research, a transceiver signal processing is embodied as programmable software to suggest a structure of a universal transceiver that can be used in various spreading schemes. It is designed suitable for a spreading scheme determined in the system based on how variables are determined in the function blocks.

However, since the method of the above research should establish variables differently at each signal processing block based on the corresponding spreading scheme, there is a problem that the signal processing is changed complicatedly and it is not proper to be operated in real-time. That is, if the spreading scheme needs to be changed in the middle of system operation, the process of establishing variables at each signal processing block should be performed with respect to the signals of each user, individually.

SUMMARY OF THE INVENTION

It is, therefore, an object of the present invention to provide a multi-carrier (MC)/multi-carrier direct sequence (MC-DS) dual-mode adaptive multi-carrier code division multiple access (MC-CDMA) apparatus that can vary the user modulation degree and the number of transmission repetition independently, and convert a spreading scheme between the time-based spreading scheme (MC-DS-CDMA) and the frequency-based spreading scheme (MC-CDMA) in a MC-CDMA system, the method of the apparatus, and a computer-readable recording medium for recording a program that implements the method.

In accordance with an aspect of the present invention, there is provided a MC/MC-DS dual-mode adaptive CDMA apparatus, comprising: a user signal processing unit for performing symbol modulation, repetition and spreading of bit stream for each user based on a transmission mode suitable for channel environment of each user, and generating spread chip streams for the user; a combining unit for adding up all the spread chip streams for the users; a first interleaving unit for interleaving the chip streams added up in the combining unit and generating a first interleaved stream; and a second interleaving unit for performing a second interleaving on the first interleaved stream, optionally, based on a spreading scheme selection signal which indicates a spreading scheme determined depending on system conditions and outputting a second interleaved stream.

In accordance with another aspect of the present invention, there is provided a MC/MC-DS dual-mode adaptive CDMA method, comprising the steps of: a) performing symbol modulation, repetition and spreading on the bit stream of each user based on the transmission mode suitable for the channel environment of each user; b) adding up all the spread chip streams of the users and performing a first interleaving; c) checking if the spreading scheme selected based on the overall system conditions is a time-based spreading scheme; d) if the selected spreading scheme is a time-based scheme, performing a second interleaving on the first-interleaved signal and outputting a signal; and e) if the selected spreading scheme is not a time-based scheme, outputting the first-interleaved signal.

In accordance with another aspect of the present invention, there is provided a computer-readable recording medium for recording a program that implements the method in a radio communication system provided with a processor, comprising the steps of: a) performing symbol modulation, repetition and spreading on the bit stream of each user based on the transmission mode suitable for the channel environment of each user; b) adding up the spread chip streams and performing a first interleaving; c) checking if the spreading scheme selected based on the overall system conditions is a time-based spreading scheme; d) if the selected spreading scheme is a time-based scheme, performing a second interleaving on the first-interleaved signal and outputting a signal; and e) if the selected spreading scheme is not a time-based scheme, outputting the first-interleaved signal.

The apparatus and method of the present invention performs the user data rate and the system spreading scheme conversion independently. Also, the apparatus and method control the data rate by generating symbols in the modulation degree and the modulations scheme determined based on the channel conditions of each user, and repeating the symbols as many times as the determined number of transmission repetition. In the present invention, the type of a system spreading scheme is determined based on whether the block interleaving, whose column and row correspond to the spreading code degree N and the number of sub-carrier Ns respectively, is performed with respect to the spread chip stream.

The method of the present invention can support two spreading schemes without any additional hardware adding to complexity. It maintains the flexibility of the conventional method that it can be used in the different spreading schemes. In addition, since the method of the present invention can be converted to the other spreading scheme in real-time easily, it can be applied to an adaptive spreading scheme conversion system usefully. This is because the method of the present invention performs the conversion of the spreading scheme after the signals of all users are added up, different from the conventional technology.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Figure 1:
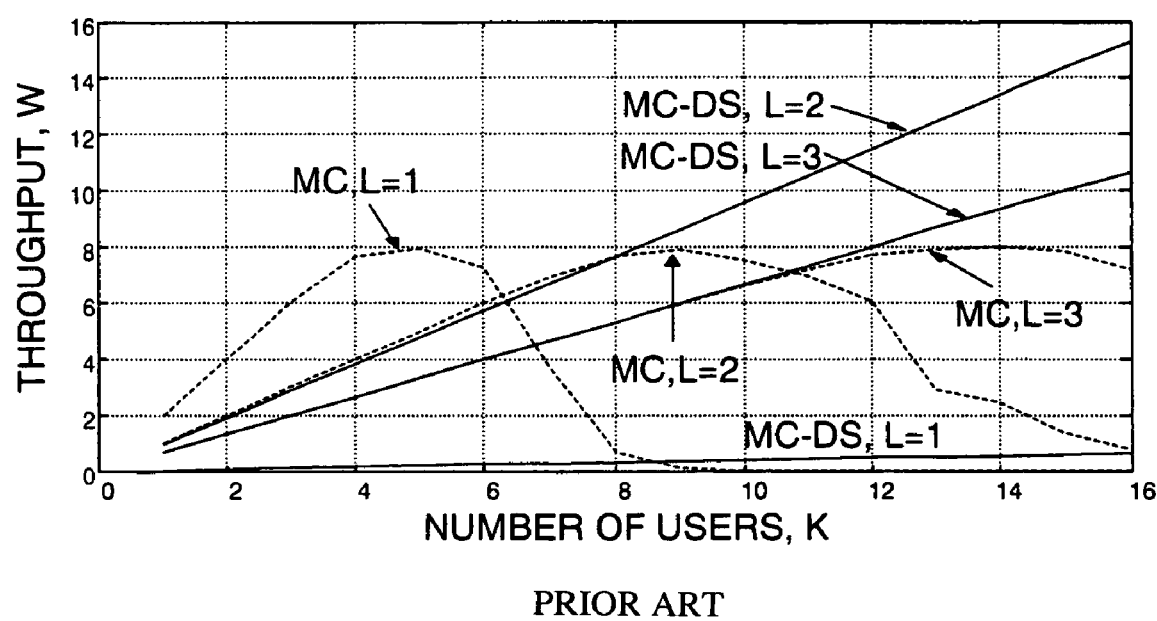
FIG. 1 is a graph showing an example of a system throughput based on the spreading mode and the number of symbol repetitions.

Other objects and aspects of the invention will become apparent from the following description of the embodiments with reference to the accompanying drawings, which is set forth hereinafter.

Generally, multi-carrier code division multiple access (MC-CDMA) is interpreted in a broad sense as a method that spreads the data symbol of each user with an orthogonal code assigned to each user, and transmits a user signal using a multi-carrier, which has different center frequencies. The MC-CDMA system can be divided into various types based on the spreading scheme, that is, how the spread chip stream is carried on a multi-carrier and transmitted.

The representative ones are MC-CDMA that is interpreted in a narrow sense and multi-carrier direct sequence (MC-DS) CDMA. In the narrow-meaning MC-CDMA system, a chip stream corresponding to one symbol is transmitted carried on a different carrier. R. Prasad and S. Hara teach that in the MC-DS-CDMA system, a chip stream corresponding to one symbol is transmitted carried on the identical carrier in an article 'An Overview of Multi-carrier CDMA,' in Proc. IEEE Int. Symp. Spread Spectrum Techniques and Applications, Mainz, Germany, Sept., 1996, pp.107-114.

In short, the narrow-meaning MC-CDMA is a system that spreads a data symbol based on a frequency, while MC-DS-CDMA spreads a data symbol based on time. The two types have advantages and disadvantages depending on the system environment. However, the present invention suggests an apparatus and method that can deal with the system environment adaptively, using the advantages of each system mode, and a recording medium therefor.

Regardless of the spreading schemes, a user can perform adaptive transmission individually in all the multi-carrier multiple access systems. That is, a user can enhance the performance and throughput of the overall system by varying the modulation mode and the number of symbol repetition transmission based on the channel condition.

For example, a user having serious fading or bad channel condition can compensate for his poor channel environment by lowering the modulation degree, increasing the number of symbol repetitions to thereby reduce the data rate and increase the symbol energy. On the other hand, a user having good channel environment can transmit more data by raising the modulation degree and the number of symbol repetitions to thereby reduce the symbol energy and increase the data rate.

As shown above, a user can obtain desired service quality by selecting and transmitting the most appropriate transmission mode to his system environment. Also, the system can prevent wasteful consumption of transmission resources, such as unnecessary electric power, time, frequencies, and thus it reduces the entire system interference. This means that the system can accommodate additional users, and the throughput of the entire system is enlarged.

Besides the control of the individual transmission resources, from a view point of the entire system, time-based symbol spreading may be more advantageous or frequency-based spreading may be more advantageous for the user's environment. This is apparent in an example showing the system throughput based on the spreading scheme of FIG. 1 and the number L of symbol repetition transmission.

FIG. 1 is a graph showing an example of a system processing capacity based on the spreading mode and symbol retransmission degree.

The system environment of FIG. 1 is as follows: N, which denotes the code length of an orthogonal user code being 16, quadrature phase shift keying (QPSK), Rayleigh fading existing, and the symbol energy to noise ratio (Es/NO) being 18 dB.

According to the drawing, if the number K of users is less than 9, the throughput of the frequency-based spreading scheme (MC-CDMA) is larger than that of the time-based spreading scheme (MC-DS-CDMA). If the number K of users is not less than 9, the result goes inversely. From the result, it can be seen that there is a spreading scheme that maximizes the throughput based on the number of users in the system. More improved throughput can be obtained by converting the spreading scheme properly based on the number of entire users, or traffic amount, who access to the system, than just using a single spreading scheme.

The present invention using the above described property suggests a dual-mode spreading adaptive MC-CDMA that selects and assigns transmission resources suitable for the channel condition of each user, and in the level of a system, this invention generalizes the conditions of the entire users and selects the most suitable spreading scheme for the system.

Figure 2:
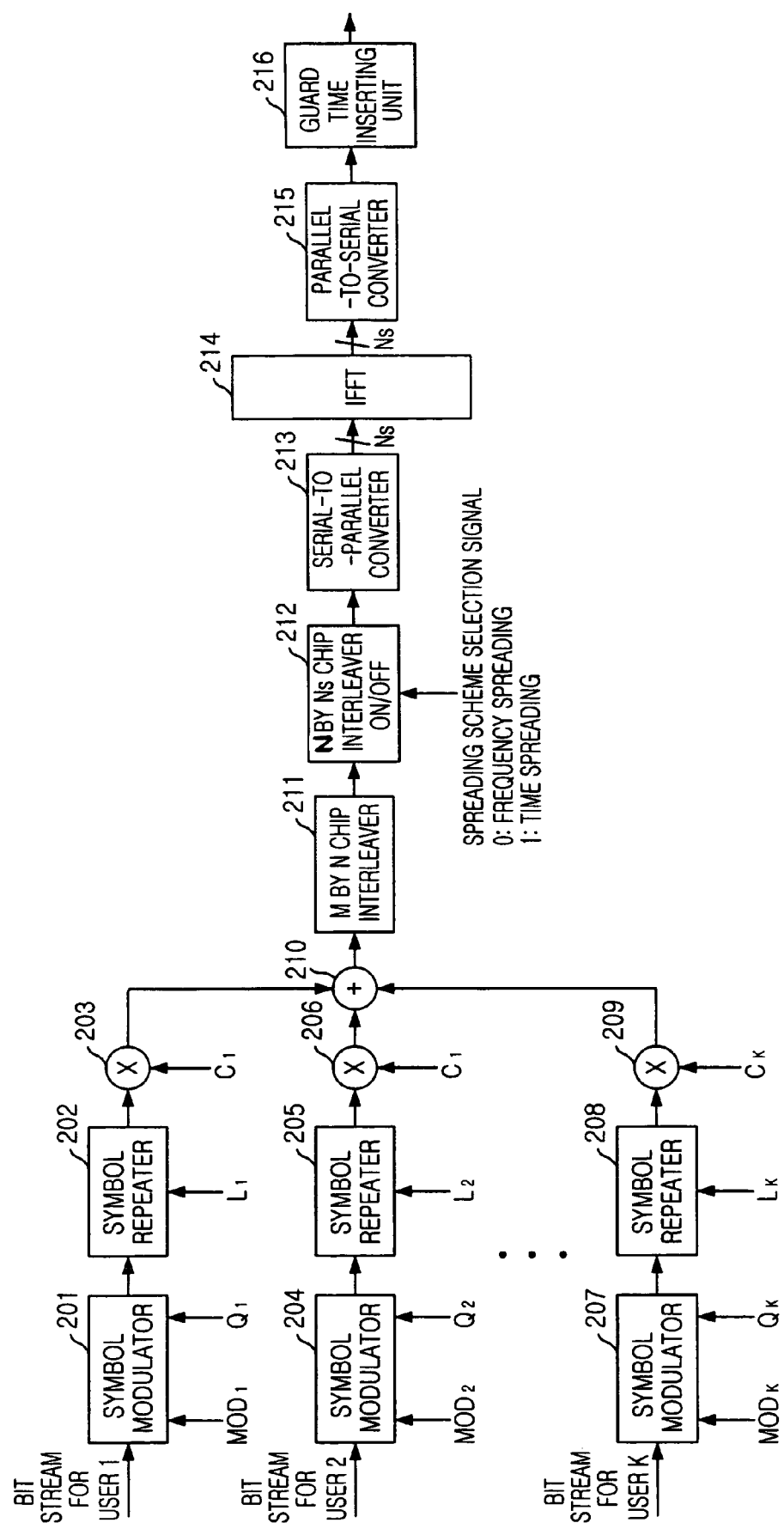
FIG. 2 is a block diagram showing a MC/MC-DS dual-mode adaptive multi-carrier code division multiple access (CDMA) apparatus in accordance with an embodiment of the present invention.

FIG. 2 is a block diagram showing a MC/MC-DS dual-mode adaptive multi-carrier code division multiple access (CDMA) apparatus in accordance with an embodiment of the present invention. The MC/MC-DS dual-mode adaptive MC CDMA apparatus includes a symbol modulator 201, 204 or 207, a symbol repeater 202, 205 or 208, a spreader 203, 206 or 209, a combiner 210, a M by N chip interleaver 211, an N by Ns chip interleaver 212, a 1:Ns serial-to-parallel converter 213, an IFFT 214, a Ns:1 parallel-to-serial converter 215 and a guard time inserting unit 216.

First, a $k^{th}$ user bit stream is modulated in the symbol modulator 201, 204 and 207 based on the modulation degree $Q_k$ (the modulation degree of the $k^{th}$ user) and the modulation mode $MOD_k$ (the modulation mode of the $k^{th}$ user, such as BPSK, QPSK, 16QAM, etc.) suitable for the channel condition of the user. Then, each modulation symbol is repeated in the symbol repeater 202, 205 or 208 $L_k$ (the number of symbol repetitions of the $k^{th}$ user) times.

Each symbol is multiplexed by an orthogonal code $C^k$ (the orthogonal code of the $k^{th}$ user) having a length N (code length of an orthogonal user code) and then spread into a chip stream. The spread chip streams of the users are synchronized with the symbol timing in the combiner 210 and added to each other. Subsequently, M by N interleaving is performed on the chip stream having N number of symbols to be transmitted simultaneously in the M by N interleaver to array the chips for the same symbol at an interval of M chips.

A system generalizes the overall conditions, including traffic condition, such as the number of users of the system, and the entire system channel condition, and then it determines a spreading scheme based on the conditions.

If the system selects a time-based spreading scheme, the N by Ns chip interleaver 212 performs N by Ns (Ns=N×M) interleaving again additionally with respect to the interleaved chip stream Ns being the number of sub-carriers.

If the system selects a frequency-based spreading scheme, 1:Ns serial-to-parallel conversion is performed in the serial-to-parallel converter 213 without any additional interleaving. That is, the chip signal corresponding to the length of Ns is converted into a parallel signal.

The Ns-long parallel signal generated through the above spreading scheme goes through Ns point inverse fast Fourier transform (IFFT) in the IFFT unit 214, and then goes through Ns:1 parallel-to-serial conversion in the parallel-to-serial converter 215. Here, the Ns-long parallel signal is converted into a serial signal. Finally, a guard time is inserted in the converted serial signal to form a bottom bandwidth signal.

As described above, the apparatus and method of the present invention has an advantage that the conversion of the spreading scheme hardly add to the system complexity because the conversion is not performed with respect to each user signal individually, but performed after the signals of all users are added up.

Figure 3:
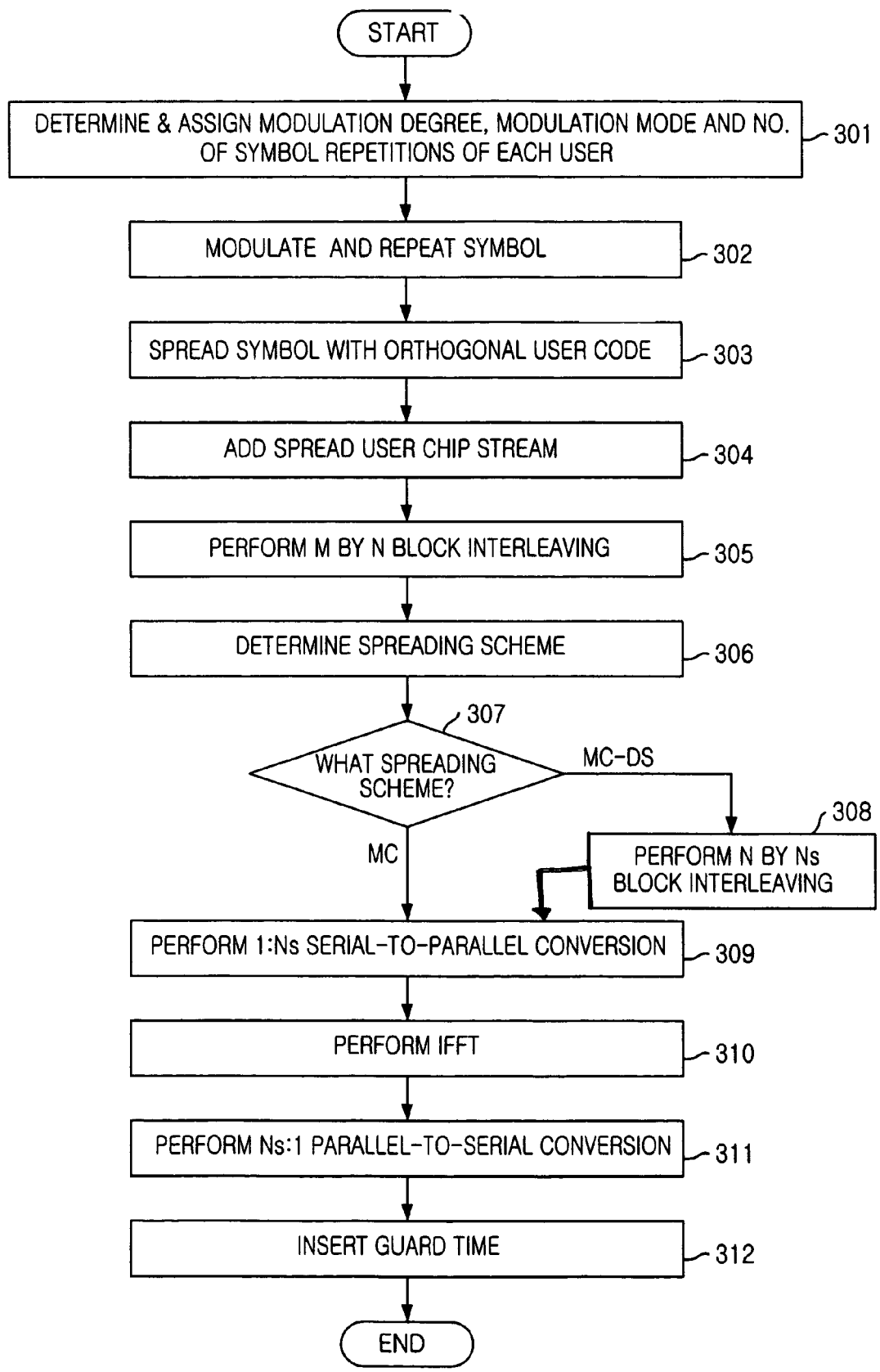
FIG. 3 is a flow chart describing a MC/MC-DS dual-mode adaptive multi-carrier CDMA method in accordance with an embodiment of the present invention.

FIG. 3 is a flow chart describing a MC/MC-DS dual-mode adaptive multi-carrier CDMA method in accordance with an embodiment of the present invention.

At step 301, a system determines and assigns the modulation degree, the modulation mode, the number of symbol repetitions to each user. That is, a transmission mode is determined suitable for the channel environment of each user.

At step 302, a bit stream of the $k^{th}$ user is modulated based on the assigned modulation mode $MOD_k$ and the modulation degree $Q_k$, and each modulation symbol is repeated in a predetermined $L_k$ times.

At step 303, each of the modulation symbols is multiplexed by the orthogonal user code having a code length of N, and then it is spread into a chip stream. At step 304, the spread chip streams of the users are synchronized with symbol timing and added to each other.

At step 305, M by N interleaving is performed on the chip stream having N number of symbols to be transmitted simultaneously, and the chips forming the same symbol are arrayed at an interval of M chips.

At step 306, a spreading scheme is determined based on the general system conditions, including traffic condition, such as the number of users in the system, and the overall channel condition of the users.

Subsequently, at step 307, it is checked what type of a spreading scheme is determined. If the system selects a time-based spreading scheme, additional N:Ns (Ns=N×M) interleaving is performed on the interleaved chip stream, Ns being the number of sub-carriers. Then, at step 309, if the system selects a frequency-based spreading scheme, 1:Ns serial-to-parallel conversion is performed without additional interleaving.

Subsequently, at step 310, IFFT is performed on the parallel chip stream. At step 311, Ns:1 parallel-to-serial conversion is carried out again and at step 312, guard time is inserted in the serial signal.

Figure 4:
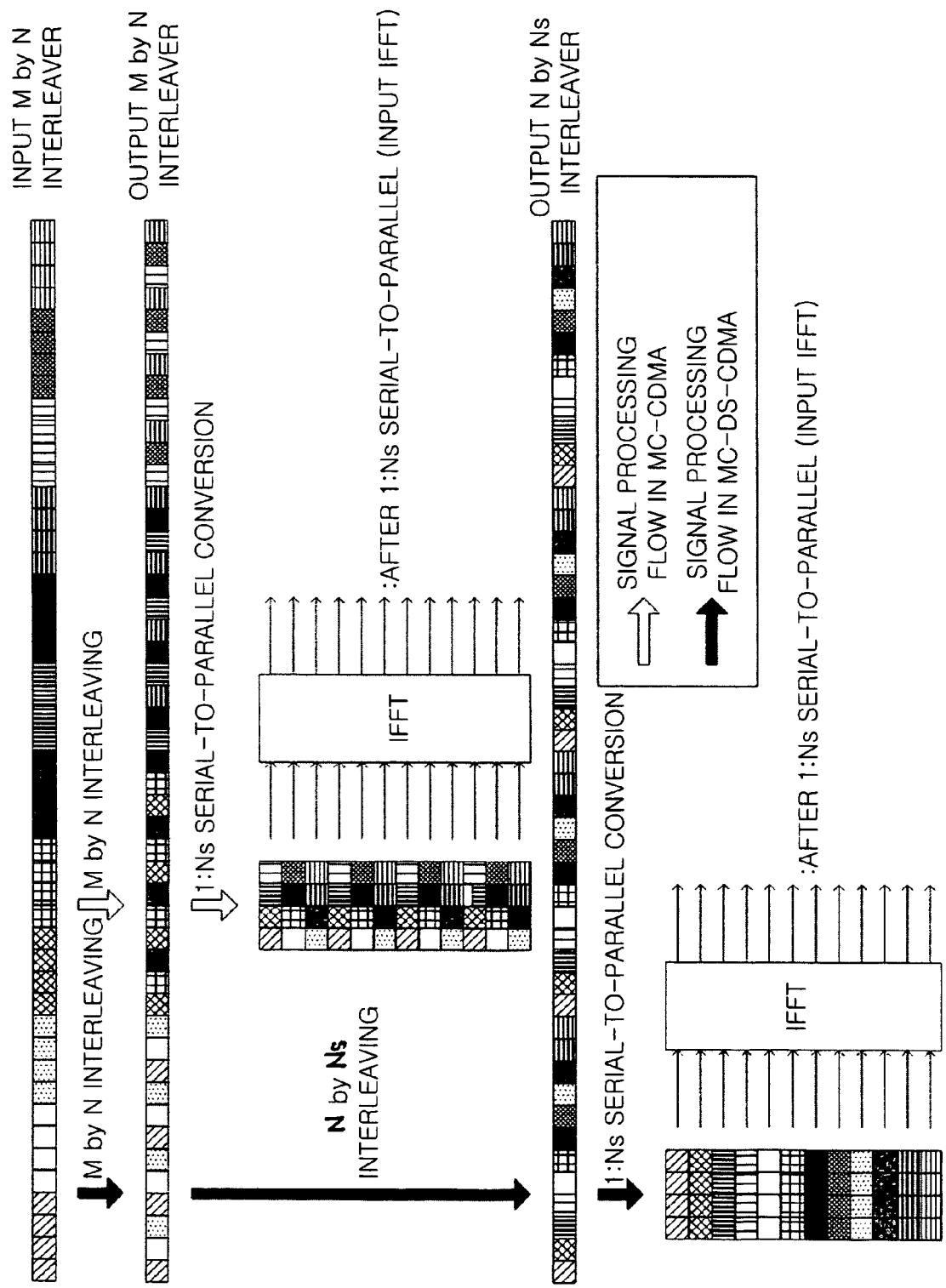
FIG. 4 is an exemplary view showing the change in the chip stream, each corresponding to a symbol, after interleaving and serial-to-parallel conversion in each spreading scheme in accordance with the present invention.

FIG. 4 is an exemplary view showing the change in the chip stream, each corresponding to a symbol, after interleaving and serial-to-parallel conversion in each spreading scheme in accordance with the present invention. The drawing shows the chip stream corresponding to each symbol after interleaving and serial-to-parallel conversion in a case where time-based spreading is selected and in a case where frequency-based spreading is selected, in a system, where N, M and Ns are 4, 3 and 12 respectively. In the frequency-based spreading, the chips belonging to a symbol maintain the interval of M chips and they are arrayed in the same parallel signal. In the time-based spreading, chips for the same symbol are arrayed in the N number of consecutive parallel chip stream with the same index.

As described above, the apparatus and method of the present invention support the time-based spreading scheme (MC-DS CDMA) and the frequency-based spreading scheme (MC-CDMA) simultaneously that can be converted to each other, and changes the modulation degree and the number of symbol repetitions, independently, according to the user channel conditions in a down-link MC-CDMA system.

The present invention provides an apparatus and method that can convert a spreading scheme between the time-based one (MC-DS CDMA) and the frequency-based one (MC-CDMA) and varies the user modulation degree and the number of symbol repetitions, thus reducing the amount of additional signal processing to convert a spreading scheme in a MC-CDMA system The apparatus and method of the present invention can maximize the performance of the adaptive transmission by selecting a proper spreading scheme based on the fading property and the number of users without increasing complexity in hardware in an adaptive MC-CDMA system that varies the modulation degree and the number of symbol repetition of each user. Since the conversion of the spreading scheme is not performed with respect to each user signal individually, but performed after the signals of all users are added up, little complexity is added to the system in the present method.

If a frequency-based spreading scheme is selected, since the chip signals of the consecutive symbols are arrayed in a parallel signal at an interval of N chips, symbol-based interleaving can be obtained inside the parallel signal.

In addition, since the apparatus and method of the present invention can support two spreading schemes without adding to complexity in hardware, they can be applied to a conventional system that supports only one spreading scheme, flexibly. Also, since the spreading scheme can be converted in real-time, the apparatus and method of the present invention can be applied to the adaptive spreading scheme conversion system.

While the present invention has been described with respect to certain preferred embodiments, it will be apparent to those skilled in the art that various changes and modifications may be made without departing from the scope of the invention as defined in the following claims.

What is claimed is:

1. A multi-carrier (MC)/multi-carrier direct sequence (MC-DS) dual-mode adaptive code division multiple access (CDMA) apparatus, comprising:
   a user signal processing means for performing symbol modulation, repetition and spreading of bit stream for each of a plurality of users based on a transmission mode suitable for channel environment of each of the users, and generating modulated and spread chip streams for each of the users;
   a combining means for adding up all the modulated and spread chip streams for the users to generate a combined chip stream;
   a first interleaving means for interleaving the combined chip streams and generating a first interleaved stream;
   a second interleaving means for selectively performing a second interleaving on the first interleaved stream based on a spreading scheme selection signal which indicates a spreading scheme determined depending on system conditions and outputting a second interleaved stream; and
   a serial-to-parallel converting means coupled to output of the second interleaving means, the serial-to-parallel converting means to generate parallel signals based on the length of a sub-carrier, align chips belonging to a symbol in a same parallel signal if the spreading scheme is frequency-based, and align the chips in consecutive parallel signals if the spreading scheme is time-based.

2. The apparatus as recited in claim 1, wherein if the spreading scheme is a time-based scheme, the second interleaving means performs the second interleaving on the first interleaved stream transmitted from the first interleaving means and outputs the second interleaved stream, or if the spreading scheme is a frequency-based scheme, the second interleaving means outputs the first interleaved stream transmitted from the first interleaving means without any additional interleaving.

3. The apparatus as recited in claim 1, further comprising:
   the serial-to-parallel converting means for converting the second interleaved stream which is serial signal and has the same length as the length of the sub-carrier, into the parallel signals, and outputting a parallel interleaved stream;
   an inverse fast Fourier transform (IFFT) means for performing inverse fast Fourier transform (IFFT) of the parallel interleaved stream based on the length of the sub-carrier, and outputting an IFFT signal;
   a parallel-to-serial converting means for converting the IFFT signal which is a parallel signal into a serial IFFT signal based on the length of the sub-carrier; and
   a guard time inserting means for inserting guard time to the serial IFFT signal.

4. The apparatus as recited in claim 1, wherein the user signal processing means comprises:
   a transmission mode determining means for determining and assigning a transmission mode, such as modulation mode, modulation order and the number of symbol repetitions, suitable for the channel environment of each user;
   a symbol processing means for modulating the bit stream for each user to generate modulated bit streams repeating the modulated bit streams, and outputting modulated symbols; and
   a spreading means for spreading the modulated symbols from the symbol processing means with a corresponding orthogonal user code.

5. The apparatus as recited in claim 4, wherein the symbol processing means and the spreading means includes a plurality of modulators, symbol repeaters and spreaders, each of which deals with each user.

6. The apparatus as recited in claim 1, wherein in the first interleaving means, a size of a block interleaving in the horizontal axis is the number of symbols to be transmitted, and the size of the block interleaving in the vertical axis is the length of an orthogonal code to be spread.

7. The apparatus as recited in claim 1, wherein in the second interleaving means, a size of a block interleaving in the horizontal axis is the length of a spreading code and the size of the block interleaving in the vertical axis is the number of sub-carriers.

8. A MC/MC-DS dual-mode adaptive CDMA method, comprising the steps of:
   a) performing symbol modulation, repetition and spreading on the bit stream of each of a plurality of users based on the transmission mode suitable for the channel environment of each of the users, and generating modulated and spread chip streams for each of the users;
   b) adding up all the modulated and spread chip streams of the users and performing a first interleaving to generate a first-interleaved signal;
   c) checking if a spreading scheme selected based on the overall system conditions is a time-based spreading scheme;
   d) if the selected spreading scheme is a time-based scheme, performing a second interleaving on the first-interleaved signal and outputting a signal;
   e) if the selected spreading scheme is not a time-based scheme, outputting the first-interleaved signal; and
   f) converting the interleaved serial signal corresponding to the length of a sub-carrier into parallel signals based on the length of the sub-carrier, aligning chips belonging to a symbol in a same parallel signal if the spreading scheme is frequency-based, and aligning the chips in consecutive parallel signals if the spreading scheme is time-based.

9. The method as recited in claim 8, further comprising:
   g) performing inverse fast Fourier transform (IFFT) on the parallel signal based on the length of the sub-carrier;
   h) converting the parallel IFFT: signal into a serial signal based on the length of the sub-carrier; and
   i) inserting guard time to the converted serial signal and outputting it as a bottom bandwidth signal.

10. The method as recited in claim 8, wherein the step a) comprises the steps of:
   a1) determining and assigning the transmission mode, such as modulation mode, modulation degree and the number of symbol repetitions, suitable for the channel environment of each user;
   a2) performing symbol modulation and repetition on the user bit stream based on the determined transmission mode at the step a1); and
   a3) spreading the modulated and spread symbol into an orthogonal user code.

11. The method as recited in claim 10, wherein the steps a2 and a3 are performed with respect to each user, independently.

12. The method as recited in claim 8, wherein in the first interleaving, the horizontal axis of a block interleaving is the number of symbols to be transmitted, and the vertical axis of the block interleaving is the length of an orthogonal code to be spread.

13. The method as recited in claim 8, wherein in the second interleaving means, the horizontal axis a block interleaving is the length of a spreading code and the vertical axis of the block interleaving is the number of sub-carriers.

14. The method as recited in claim 8, wherein the overall system conditions include the traffic condition such as the number of system users, and the entire channel condition of the users.

15. A computer-readable recording medium for recording a program that implements the method in a radio communication system provided with a processor, comprising the steps of:
  a) performing symbol modulation, repetition and spreading on the bit stream of each of a plurality of users based on the transmission mode suitable for the channel environment of each of the users, and generating modulated and spread chip streams for each of the users;
  b) adding up the modulated and spread chip streams and performing a first interleaving to generate a first-interleaved signal;
  c) checking if a spreading scheme selected based on the overall system conditions is a time-based spreading scheme;
  d) if the selected spreading scheme is a time-based scheme, performing a second interleaving on the first-interleaved signal and outputting a signal;
  e) if the selected spreading scheme is not a time-based scheme, outputting the first-interleaved signal; and
  f) converting the interleaved serial signal corresponding to the length of a sub-carrier into parallel signals based on the length of the sub-carrier, aligning chips belonging to a symbol in a same parallel signal if the spreading scheme is frequency-based, and aligning the chips in consecutive parallel signals if the spreading scheme is time-based.

* * * * *